Patented Feb. 15, 1949

2,461,506

UNITED STATES PATENT OFFICE 2,461,506

PROCESS FOR REGENERATION OF ION EXCHANGE MATERIAL

Frederick K. Daniel, Kew Gardens, N. Y., assignor to Sun Chemical Corporation, New York, N. Y., a corporation of Delaware No Drawing. Application October 18, 1946, Serial No. 704,269

4 Claims. (Cl. 252—182)

This invention relates to processes for effecting regeneration or reactivation of deactivated ion exchange materials, and has particular reference to processes for regenerating an ion exchanger whose constituents consist of an intimate mixture of cation and anion exchange material, such as ion exchange unit, which is adapted to remove or exchange both anions and cations, being referred to as a duplex ion exchanger.

It is an object of the present invention to provide a process for effecting regeneration of a duplex ion exchanger which is simple and economical in operation and provides a regenerated material ready for re-use in ion exchange operations.

Another object of the present invention is to provide a simple and effective method for separating constituents of a duplex ion exchanger into cation exchange and anion exchange components with subsequent reactivation of each component and effective readmixing for re-use.

Other objects of the present invention will be apparent from the following description and appended claims.

In certain commercial operations wherein aqueous solutions or dispersions are employed it is necessary to provide a method for removing from such aqueous solutions or dispersions undesirable electrolyte or ion material. For example, there is set out in my copending application Serial No. 704,268, filed on even date herewith several examples of materials whose commercial value and possible utilization depends upon removal therefrom of undesirable and objectionable electrolytes and, in certain instances, material of a more colloidal nature which have basic, acid or amphoteric properties. In this copending application there is illustrated a method for effecting satisfactory removal of such undesirable non-colloidal electrolyte and colloidal electrolytes, wherein the original material is subjected to a dialysis operation to effectively reduce the concentration of electrolyte material down to the order of one percent or less, after which a predetermined amount of remaining non-colloidal electrolyte material and undesirable basic or acidic colloidal substances of higher molecular weight are effectively separated by utilization of a duplex ion exchanger. In such operation, in the ion exchange step of the process, both cations and anions, including acidic or basic colloidal materials, are effectively separated to a predetermined extent without deleterious effect upon the materials remaining in the liquid. For example, as set forth in this copending application, in the preparation of antitoxin materials the active constituents commonly are precipitated out of the blood from which they are obtained by addition thereto of salts, such as ammonium sulfate. The precipitated material thereafter may be dissolved or dispersed in water in effecting preparation of pharmaceutical products. By the process of redissolving there is necessarily carried along together with the active gamma globulin constituents a substantal proportion of ammonium sulfate which dissolves in the water together with a small proportion of high molecular weight proteinaceous products whose presence in the serum is undesirable. The ammonium sulfate is particularly objectionable where the preparation is to be used for pharmaceutical purposes and has to be reduced to less than one-tenth of one per cent of the solution. In accordance with my above identified copending application, the initially prepared antitoxin material first is subjected to continuous dialyzing operation, as described in my prior United States Patents Nos. 2,201,812 and 2,365,457. By such continuous dialysis the electrolyte content of the antitoxin material is reduced to one per cent or less in a very short time and without excessive dilution of the antitoxin preparation with water. At this point the preparation, according to my copending application, is transferred from the dialysis apparatus and caused to pass through a bed of ion exchange material which will effectively act as an adsorbent or ion exchanger for ammonium sulfate, as well as for the undesirable proteinaceous impurities, and gives a superior product in much shorter time. For example, the cation exchange material known as Amberlite IR–100, manufactured by the Resinous Products and Chemical Company, may be effectively used to secure removal and adsorption of unwanted ionized colloidal material of alubuminous nature, together with other cation material. To remove effectively the sulfate ion and other anion materials present in the dialyzed preparation, an anion exchange resin or adsorbent such as Amberlite IR–4 manufactured by Resinous Products and Chemical Company, satisfactory is used. In operation the two resinous materials are admixed and placed in a suitable column and the dialyzed preparation caused to flow downward through such column. By this method an effluent is secured which is substantially freed of all objectionable non-colloidal and colloidal impurities. And as set out in my application Serial Number 566,403, filed December 2, 1944, of which the present application is a continuation-in-part, in certain instances it is desirable to provide a liquid material which has, in place of the undesirable electrolyte material a concentration of sodium chloride is isotonic proportions. For example, in preparation of certain biological materials intended for utilization by injection into the blood stream, the presence of sodium chloride in isotonic proportion in the serum is particularly desirable, so that no undue dilution of the concentration of sodium chloride necessary in the human system will be occasioned on the introduction of the serum. In such instances, as set out in the application above referred to, a process is provided for securing a preparation with such isotonic proportion of sodium chloride, by providing a duplex ion exchanger which removes undesirable electrolyte materials from the biological preparation, and substitutes in place thereof sodium chloride in the desired proportion. In such instances the duplex ion exchanger, when it has become deactivated, may be regenerated by utilization of sodium chloride as a regenerating material, and the ion exchanger may be regenerated with the admixed cation exchange and anion exchange materials in situ and without necessity for effecting any separation of the ion exchange components before regeneration.

In other operations concerned with the preparation of liquid material, it may be necessary to effect substantially complete removal of all undesirable non-colloidal electrolyte and colloidal electrolyte, and to effect such removal without replacing these unwanted materials with other electrolytes. And with such preparations it is desirable to effect removal of the undesirable electrolyte material in such fashion that the anion material and cation material are removed simultaneously, so that the material which is being treated will not be deleteriously affected as in cases where the anion material and cation material are removed in separate operations. For in such instances the liquid material may be objectionably affected by such treatment, as for example, in the preparation of certain pH sensitive biological preparations, where exposure to cation exchange material in the hydrogen cycle might cause gelling of the entire preparation which would render it unfit for further use.

By practicing the present invention there is provided a process whereby a duplex ion exchanger may be economically and effectively employed for removal of undesirable and objectionable electrolytes and/or colloidal electrolytes. The present invention provides a process whereby the duplex ion exchange materials can be regenerated effectively after they have become deactivated by use, by a process which is simple and effective, and permits of economical use of such duplex ion exchange materials in effecting removal of electrolytes and colloidal material as above referred to.

According to the present invention the duplex ion exchanger is so constituted that it contains a cation exchange component and anion exchange component or adsorbent of such physical characteristics that these two components can be effectively separated after use, and separately regenerated and admixed for re-use.

In one illustrative method of practicing the present invention, the duplex ion exchanger is so constituted that the cation exchange component has a density or, more accurately, an apparent density when placed in a liquid material in the form utilized, which is different from that of the anion exchange component. When such duplex ion exchanges becomes deactivated through use in an ion removal operation the ion exchanger first is washed with sufficient water to remove therefrom any entrained liquid material of the preparation being treated. Subsequently a liquid material whose density is intermediate between that of the cation exchange material and the anion exchange material or adsorbent is employed to flood the duplex ion exchanger in a quantity more than sufficient to cover completely the mixed exchange material. Upon such operation, because of the density differences of the constituents, exchange material of lighter density will be caused to float to the top of the liquid material, and the material of heavier density will collect at the bottom of the liquid material. When such stratification is completed, the stratified material may be separated as, for example, by adding sufficient liquid material of intermediate density to cause the ion exchange material of lighter density to overflow from the duplex ion exchange container into a separate container. The liquid material then is removed, as by draining from each of these separated ion exchange materials, and satisfactorily the drained ion exchange components then may be washed to remove residual liquid material of intermediate density. Subsequently the separated materials are regenerated, and in this operation the cation exchange materials may be regenerated by treatment with an acid material and the anion exchange component regenerated by treatment with an alkali. In this step the undesirable electrolyte material which was removed from the liquid preparation and which is present in the ion exchange component is removed or replaced, and the ion exchange components are ready for re-use in a removal operation. Before such re-use, however, the ion exchange components are washed, as with water, to effect removal of any residual acid and alkaline materials present.

To effect admixing of the two separately regenerated ion exchange components before re-use the material of lighter density may be brought into the container in which the material of greater density is maintained by flooding the container containing the lighter density material and causing it to flow back into the duplex ion exchange container. To complete admixing of the regenerated components they may be subjected to the action of a liquid material under conditions such that turbulent flow with consequent effective admixing is secured.

The following example is given, illustrative of successful commercial practicing of the process of the present invention:

A mixture of the cation exchange resin known as Amberlite IR–100 and derived from a polyhydric phenol and formaldehyde, and in the form of a homogeneous gel and the anion exchange resin or adsorbent known as Amberlite IR–4 and derived from an aromatic or aliphatic amine and formaldehyde, and in the form of a homogeneous gel, both produced by the Resinous Products & Chemical Company, is utilized in a duplex ion exchanger comprising a vertical column to effect removal of objectionable ions and colloidal impurities from a crude antitoxin preparation. When the duplex ion exchanger becomes deactivated, and this can be ascertained by testing the effluent for the presence of ions, the flow of material through the column is discontinued. The biological preparation remaining in the interstices of the duplex ion exchanger is removed by adding sufficient water to the ion exchanger to wash out such material. After the water wash and drainage of the water, an aqueous solution of sugar which has a specific gravity of about 1.26 is pumped into the ion exchanger column from the base in amount sufficient to completely fill the column. The Amberlite IR–100, which has an apparent specific gravity greater than 1.26, settles out at the bottom of the column, while the Amberlite IR–4, which has an apparent specific gravity less than 1.26, floats to the top of the column. At this point some additional sugar solution is added to the column from the base in amount sufficient to effect removal of that portion of the solution which is near the top of the column and which has associated therewith the Amberlite IR–4 resin. From the top of the ion exchanger column, the admixed sugar solution and resin is flowed to a second column wherein the sugar solution is separated from the resin, as by a strainer placed at the base of such column.

To insure quantitative separation of the ion exchange components the material in the duplex ion exchanger column is again treated with a solution of sugar of the same specific gravity to insure stratification of any Amberlite IR–4 which may have been entrapped with the resins of greater density during the initial resin operation. The second quantity of stratified resin material is likewise transferred to the second column wherein the first portion of sugar solution and Amberlite IR–4 has been placed.

Both columns then are drained of the sugar solution, the columns washed with water to remove residual solution, and the ion exchange material in each column reactivated or regenerated. In the case of the Amberlite IR–100 regeneration can be effected by treating the material with a mineral acid such as hydrochloric acid, subsequently removing the excess acid, and thereafter washing the regenerated ion exchange material to remove the residual acid material. The Amberlite IR–4 resin similarly is regenerated using a sodium hydroxide or sodium carbonate solution in place of the mineral acid employed with the cation exchange resin.

When the ion exchange components have been regenerated, the anion exchange component is admixed with the cation exchange component. This may be effectively accomplished either by backwashing with water or by pumping into the second column containing the anion exchange component an aqueous solution of sugar of the same density as that initially employed for effecting stratification in amount sufficient to flood such column so that the liquid, carrying with it the Amberlite IR–4 resin, is effectively transferred to the duplex ion exchanger column. At this point the sugar solution satisfactorily is removed, as by draining, and the ion exchange components effectively admixed by pumping into the duplex ion exchange column water under conditions such that turbulent flow is secured with concomitant admixing of the resinous materials present in the column. When such admixing has been effected the water is removed, as by draining, and the column is ready for re-use.

By utilization of the process of the present invention it is unnecessary to employ a newly made and unused mixture of resinous materials in order to secure effective ion exchange, since by the present invention the originally prepared resin can be re-used over and over again, with regeneration as described when the admixed ion exchange materials become deactivated. If it were necessary to employ freshly prepared resin which had to be discarded as soon as it had become deactivated, it would be wholly uneconomical to employ such ion removal process. In addition, the present process is extremely economical in operation and in the use of materials. In the present process a small quantity of the liquid material, such as the sugar solution, may be lost during each operation during the washing operation which follows the stratification procedure. In a continuous process of ion exchange and regeneration a small quantity of make-up solution may be added to replace that lost during the processing. Further, by the practicing of the present invention, the characteristics of the ion exchange materials, so far as the physical appearance is concerned, is not at all affected, and there is substantially no loss of such material throughout the entire process.

Other ion exchange materials than those set forth in the illustrative example may be utilized. In choosing such materials the density or specific gravity of the materials should be considered and components chosen which have a density or specific gravity different from each other. One component should have an apparent specific gravity or density less than that of the liquid material used to effect stratification, and the other component should have an apparent density or specific gravity greater than that of the liquid material utilized in the stratification step.

The aqueous solution of sugar mentioned above in connection with the specific illustrative example has a relatively high viscosity. In many instances it is found desirable to warm the sugar solution before use, to provide a liquid material of lower viscosity and which can be handled more easily in the operations above referred to. Instead of the sugar solution, other liquid materials, such as mixtures of glycerine and water or mixtures of corn syrup and water, may be utilized in effecting stratification. Such mixtures are prepared so that they have a specific gravity or density intermediate between that of the two ion exchange component materials selected, and should be inert to both materials.

In the above illustrative example a continuous stratification procedure was set forth. In certain instances it may be desirable to effect separation by a batch operation. In some cases it has been found satisfactory to bring about such stratification after admixing the ion exchange components with the liquid of intermediate specific gravity or density by a centrifuging operation which is effective to separate the constituents of different apparent density.

Reference has been made heretofore to the apparent specific gravity or apparent density of the ion exchange materials utilized. Because of the nature of such ion exchange materials the apparent density depends to some extent upon the physical nature of the materials as they are prepared. It appears that in some instances because of the porosity of the material with the consequently great number of air spaces and channels, that a particular ion exchange material will have an apparently lower density or specific gravity when it is used as somewhat large granules than when it is ground and the porous structure removed to any extent. In connection with this application, the apparent specific gravity or apparent density refers to these characteristics of the ion exchange materials in the physical form in which they are utilized. In other words, if an ion exchange material will float when in contact with a sugar solution having a specific gravity of 1.26, the ion exchange material is said to have an apparent specific gravity less than 1.26. And the reverse is true with the material having an apparent specific gravity greater than 1.26, or greater than the liquid of intermediate density chosen to effect stratification.

Another method for providing for efficient separation and regeneration of a duplex ion exchanger is based upon a different physical attribute of the ion exchange materials. In the previous example stratification is effected with ion exchange materials of different densities, which densities are sufficiently far apart so that a liquid material intermediate in specific gravity or density may be utilized for effective separation of the exchange constituents. Successful results in practical operations also can be secured by preparing the ion exchange components of the duplex ion exchanger so that in use the maximum particle size of one of said components will be smaller than the minimum particle size of the other component. For example, the cation exchange component may be prepared so that the particle size of the constituent materials is sufficiently large that the cation exchange component will pass through a 20 mesh screen and will be retained on a 40 mesh screen. The anion exchange component may be prepared so that its particle size is such that the anion exchange component will pass through a 40 mesh screen and be retained on an 80 mesh screen.

Using a mixture of such sized materials in the duplex ion exchanger, the stratification step prior to regeneration can be secured by transferring the spent duplex exchanger onto a 40 mesh screen, and effecting separation by washing through the screen onto an 80 mesh screen those materials which have a particle size finer than 40 mesh. Other methods of screening, for example, a shaking operation, likewise may be utilized to effect such separation. In this way the cation exchange materials and the ion exchange material may be effectively separated from each other. Subsequently they may be regenerated and readmixed for use as described heretofore in connection with the liquid stratification method.

While the processes herein described constitute preferred embodiments of the invention, it is to be understood that the invention is not limited to these precise processes, and that changes may be made therein without departing from the scope of the invention which is defined in the appended claims.

What is claimed is:

1. The process of regenerating a deactivated duplex ion exchanger comprising a mixture of cation resin exchange and anion resin exchange components, said cation exchange component having an apparent density different from said anion exchange component, which comprises the steps of flooding said duplex ion exchanger with a liquid material whose density is intermediate between the apparent densities of said cation exchange component and said anion exchange component in amount sufficient to effect stratification of said cation exchange component from said anion exchange component, effecting separation of said stratified ion exchange components, effecting regeneration of said separated ion exchange components, and thereafter admixing said regenerated ion exchange components.

2. The process of regenerating a deactivated duplex ion exchanger comprising a mixture of cation resin exchange and anion resin exchange components, said cation exchange component having an apparent density different from said anion exchange component, which comprises the steps of flooding said duplex ion exchanger with a liquid material comprising an aqueous solution of sugar whose density is intermediate between the apparent densities of said cation exchange component and said anion exchange component in amount sufficient to effect stratification of said cation exchange component from said anion exchange component, effecting separation of said stratified ion exchange components, effecting regeneration of said separated ion exchange components, and thereafter admixing said regenerated ion exchange components.

3. The process of regenerating a deactivated duplex ion exchanger comprising a mixture of cation resin exchange and anion resin exchange components, said cation exchange component having an apparent density different from said anion exchange component, which comprises the steps of flooding said duplex ion exchanger with a liquid material whose density is intermediate between said cation exchange component and said anion exchange component in amount sufficient to effect stratification of said cation exchange component from said anion exchange component, effecting separation of said stratified ion exchange components, effecting regeneration of said cation exchange component with an acid material and effecting regeneration of said anion exchange component with an alkaline material, removing residual acid and alkali from said regenerated ion exchange components, and thereafter admixing said regenerated ion exchange components.

4. The process of regenerating a deactivated duplex ion exchanger comprising a mixture of cation resin exchange and anion resin exchange components, said cation exchange component having an apparent density different from said anion exchange component, which comprises the steps of flooding said duplex ion exchanger with a liquid material comprising an aqueous solution of sugar whose density is intermediate between said cation exchange component and said anion exchange component in amount sufficient to effect stratification of said cation exchange component from said anion exchange component, effecting separation of said stratified ion exchange components, removing from said liquid material said separated ion exchange components, effecting regeneration of said separated cation exchange component with an acid material and effecting regeneration of said anion exchange component with an alkaline material, removing from said regenerated ion exchange components residual acid and alkaline materials by washing, and thereafter admixing said regenerated ion exchange components.

FREDERICK K. DANIEL.

REFERENCES CITED

The following references are of record in the file of this patent:

UNITED STATES PATENTS

| Number | Name | Date |
| --- | --- | --- |
| 2,366,651 | Rawlings | Jan. 2, 1945 |